United States Patent
Tran et al.

(10) Patent No.: US 7,768,663 B2
(45) Date of Patent: Aug. 3, 2010

(54) SYSTEM AND METHOD FOR PRINTING BOOKS BY BOOK IDENTIFICATION

(75) Inventors: Peter H N Tran, Garden Grove, CA (US); Marianne L. Kodimer, Huntington Beach, CA (US); Amir Shahindoust, Laguna Niguel, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1412 days.

(21) Appl. No.: 10/770,612

(22) Filed: Feb. 2, 2004

(65) Prior Publication Data

US 2005/0172240 A1 Aug. 4, 2005

(51) Int. Cl.
*G06F 3/12* (2006.01)
*G06F 7/00* (2006.01)
*G06F 17/30* (2006.01)
*G06Q 30/00* (2006.01)

(52) U.S. Cl. .................. 358/1.15; 705/26; 707/3; 707/6; 707/10; 707/102; 715/255; 715/274; 715/700; 715/733; 715/740; 709/217; 709/223

(58) Field of Classification Search .............. 358/1.15; 715/764
See application file for complete search history.

(56) References Cited

U.S. PATENT DOCUMENTS

| | | | | |
|---|---|---|---|---|
| 5,579,447 A | * | 11/1996 | Salgado | 358/1.9 |
| 5,604,579 A | * | 2/1997 | Kushida | 355/400 |
| 5,957,697 A | * | 9/1999 | Iggulden et al. | 434/317 |
| 6,557,006 B1 | * | 4/2003 | Headrick et al. | 1/1 |
| 6,633,223 B1 | * | 10/2003 | Schenker et al. | 340/5.53 |
| 6,729,543 B1 | * | 5/2004 | Arons et al. | 235/462.13 |
| 7,188,311 B2 | * | 3/2007 | Tanaka et al. | 715/248 |
| 7,263,524 B2 | * | 8/2007 | Wiley | 1/1 |
| 7,314,178 B2 | * | 1/2008 | Rines et al. | 235/472.01 |
| 7,349,113 B2 | * | 3/2008 | Ferlitsch et al. | 358/1.15 |
| 2002/0049781 A1 | | 4/2002 | Bengtson | |
| 2002/0099623 A1 | | 7/2002 | Yukino | |
| 2002/0116293 A1 | | 8/2002 | Lao et al. | |
| 2002/0152215 A1 | * | 10/2002 | Clark et al. | 707/10 |
| 2003/0040985 A1 | | 2/2003 | Yukino | |
| 2003/0059758 A1 | * | 3/2003 | Cohen et al. | 434/317 |
| 2003/0110084 A1 | | 6/2003 | Eberhard et al. | |
| 2003/0179908 A1 | | 9/2003 | Mahoney et al. | |
| 2003/0191821 A1 | | 10/2003 | Schena et al. | |
| 2003/0208447 A1 | | 11/2003 | Stefik et al. | |
| 2003/0217010 A1 | | 11/2003 | Stefik et al. | |
| 2003/0225699 A1 | | 12/2003 | Stefik et al. | |
| 2003/0225701 A1 | | 12/2003 | Lee et al. | |
| 2004/0003240 A1 | * | 1/2004 | Lai et al. | 713/165 |

FOREIGN PATENT DOCUMENTS

JP 10091708 A * 4/1998

* cited by examiner

*Primary Examiner*—King Y Poon
*Assistant Examiner*—Hilina S Kassa
(74) *Attorney, Agent, or Firm*—Tucker Ellis & West LLP

(57) ABSTRACT

A system and method for efficiently copying books. According to the system and method, a user inputs a book identification into a peripheral device to cause the peripheral device to access an electronic version of the book. Upon so accessing, the peripheral is adapted to print the electronic version as specified. The book identification may be any suitable identification, such as a book ISBN number, a bar code, a title, etc.

36 Claims, 3 Drawing Sheets

SYSTEM AND METHOD FOR PRINTING BOOKS BY BOOK IDENTIFICATION

BACKGROUND OF THE INVENTION

The present invention is directed to a system and method for printing, and more particularly, the present invention is directed to a system and method for printing books by a book identification.

Books and other monographic publications are frequently copied on copy machines. The current method of copying books is time intensive, laborious and inefficient. A user must first open the book to the desired page, flip the book upside down and place the page on the copier surface and then copy. If a copy of more than one page of the book is desired, this entire process must be repeated until all pages are copied. If copies of multiple pages are desired, the process can require a great deal of time to complete. Thus it is desirable to have a system and method for more efficiently and easily copying books and other monographs.

Books and other monographic publications typically include identification information. For example, books typically have a title and an associated author. If either or both the title and author information are known, the respective book can be located electronically (e.g., in a database) or physically (e.g., in a library). Books usually have additional identification information such as an ISBN (International Standard Book Number). The ISBN is a unique identification number that marks any book unmistakably. The ISBN can be used just as the title and author information in searching for a book. In fact, the ISBN is often considered a superior identification in searching for a book, as there can be confusion with other titles and author names. The ISBN may be provided as a number, as information encoded in a barcode, or both.

SUMMARY OF THE INVENTION

In accordance with the present invention, there is provided a system and method for printing books by a book identification. It is desirable to have a system and method for more efficiently and easily copying books and other monographs.

In accordance with one aspect, the present invention teaches a system, implemented through a peripheral device, for printing electronic files. The system includes identification receiving means adapted for receiving data representative of book identification information; electronic file retrieving means adapted for retrieving an electronic file, responsive to received book identification information, wherein the electronic file is representative at least one selected book; print job creation means adapted for preparing the electronic file for printing thereafter; output means adapted for receiving print request data representative of a desired output of the print job; and means adapted for commencing a print operation of the electronic file in accordance with the print request.

In accordance with another aspect, the present invention teaches a method, implemented through a peripheral device, for printing electronic files. The method includes the steps of receiving data representative of book identification information; retrieving an electronic file, in response to the received book identification information, wherein the electronic file is representative of the book; creating a print job by preparing the electronic file for printing; receiving print request data representative of a desired output of the print job; and commencing a print operation of the electronic file in accordance with the print request.

These and other aspects, advantages and features of the invention will be understood by one of ordinary skill in the art upon a reading and understanding of the specification.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF PREFERRED EMBODIMENTS

Figure 1:
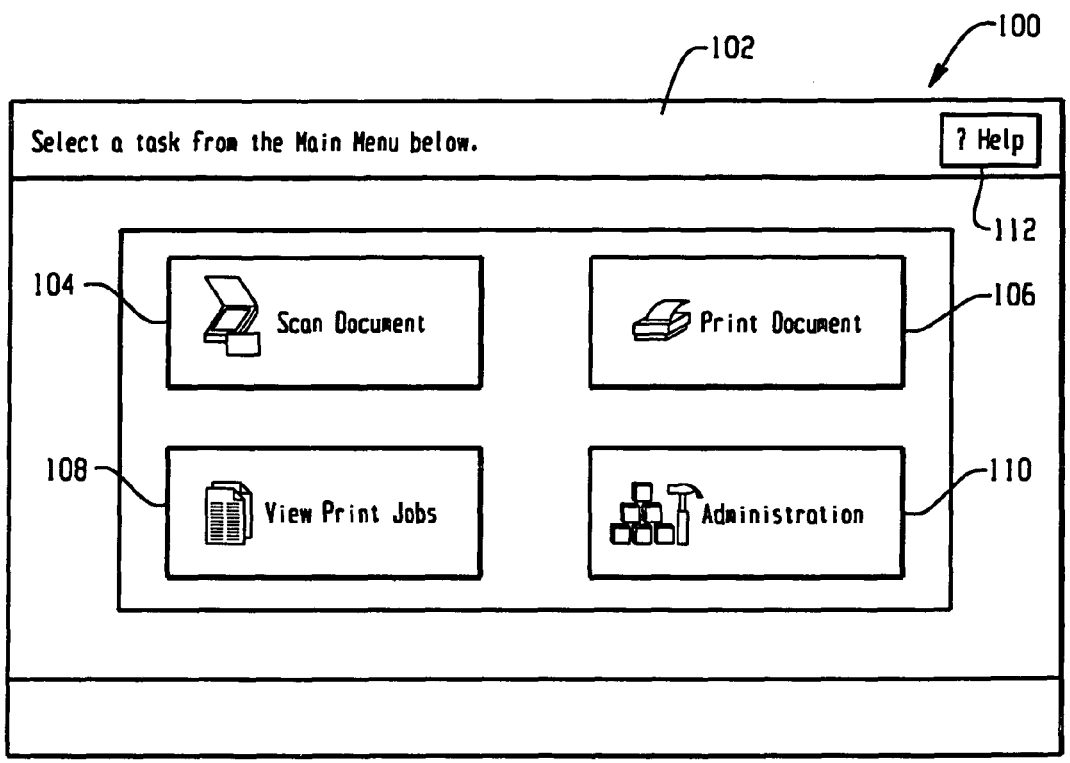
FIG. 1 is a view of an example peripheral user interface of the present invention.

The present invention is a system and method for copying books that overcomes the inefficiencies of conventional book copying systems and methods. An efficient copying system is achieved by adapting a peripheral device to access and utilize electronic versions of books to print copies of the books. To make a copy of a physical book, a user inputs an identification of the book into the peripheral, the peripheral accesses the electronic version of the book and prints the book as specified. Thus, a user is not required to manually place a page of the book on the copier surface, copy and repeat the process to copy each desired page. The system and method are generally implemented in a peripheral device. The peripheral device is any of a suitable plurality of devices, such as a copier, a printer, a multifunction peripheral, etc, and suitably is a stand-alone device, interconnected to other devices, or to a network.

According to an example embodiment of the invention, a user first inputs an identification of the book to be copied into the peripheral device. The book identification is any identification suitable to unambiguously identify the book, such as a book ISBN (International Standard Book Number), a book title, a book bar code, etc. The identification is input into the peripheral device by any suitable means, such as through a screen-like control panel and keyboard associated with the peripheral, a touch-pad screen-like control panel associated with the peripheral, a keyboard or keypad associated with the peripheral, etc. The identification input means need not be directly associated with the peripheral, such as a computer connected to the peripheral through a network, an Internet-accessible web page or user interface in communication with the peripheral, etc. Additionally, the identification input means suitably includes a bar code reader adapted to electronically capture and input book identification information encoded by the bar code typically placed on an exterior surface of the book.

Upon entry of the book identification, the peripheral device will access an electronic version of the identified book. The invention contemplates that electronic versions of books, such as PDF files, Microsoft Word files, etc., will be stored and accessible in storage devices. The invention additionally contemplates at least three types of storage devices, such as a local storage device, a remote storage device and an Internet-accessible storage device, etc. In general, the storage devices are suitably any device, such as a hard disk drive, RAM, ROM, a removable disk drive, a USB-DSD (Universal Serial Bus Data Storage Device), etc., adapted to store electronic versions of books. The local storage device is suitably any device contained within, directly wired to, or in general data communication with the peripheral. The remote storage device is suitably any storage device located remote to the peripheral, such as a computer, a server, etc., connected to the peripheral through a network or other suitable means. The Internet-accessible storage device is suitably any suitable World Wide Web page accessible to the peripheral. The peripheral suitably is in data communication with some, all, a portion of, or additional storage devices through any appropriate communication means, such as through standard port communication, over a network, over the Internet or wirelessly (e.g., through a communication such as BlueTooth™, IR, 802.11-type system, etc.). Additionally, accordingly to an alternate embodiment, the electronic version of the book is advantageously supplied to the peripheral by a user, such as through a floppy disk, CD-ROM, USB-DSD, etc.

Once the peripheral accesses the electronic version of the book, it will be ready to print hard copies of the book. The user is suitably presented with the option of printing all of the book or only certain user-specified pages. The user is advantageously also provided with an opportunity to set or change print settings that control the format of printing. Once the user is satisfied with the pages and the settings, the pages print as specified.

The peripheral suitably includes a set of computer-readable instructions for accessing the electronic file. Such instructions advantageously dictate that the peripheral first search a local storage device for the desired electronic file. If the local storage device does not contain the electronic file, the instructions suitably then dictate that the peripheral search a remote storage device. If the remote storage device does not contain the electronic file, the instructions suitably further dictate that the peripheral search the Internet-accessible web page or user inteface. In connection with the Internet search, the peripheral suitably includes instructions that point the peripheral to access to a specific Internet URL (Uniform Resource Locator) that maintains a web page storing the desired electronic file, or suitably contains instructions for accessing an Internet search engine to locate the electronic file. The Internet instructions advantageously additionally include a sequential set of instructions for first accessing a specific Internet URL and then, if the specific URL does not contain the electronic file, for accessing an Internet search engine.

An example method for implementing the present invention will now be discussed. It is to be understood that the following is an example only, and that the invention may be implemented through any suitable method as will be appreciated by one of ordinary skill in the art. With reference to FIG. 1, illustrated is an example view of a peripheral user interface 100 that a user suitably encounters when attempting to access the peripheral to begin the book copying process. The interface 100 advantageously is provided in any of the aforementioned manners in connection with the peripheral. The interface presents at least one operational option to the user, such as a scan option 104, a print option 106, a view print jobs option 108, an administrative tool option 110, a help option 112, etc. According to the present example, the user will first activate the print document option 106 on the user interface 100 to begin the book copying operation.

Figure 2:
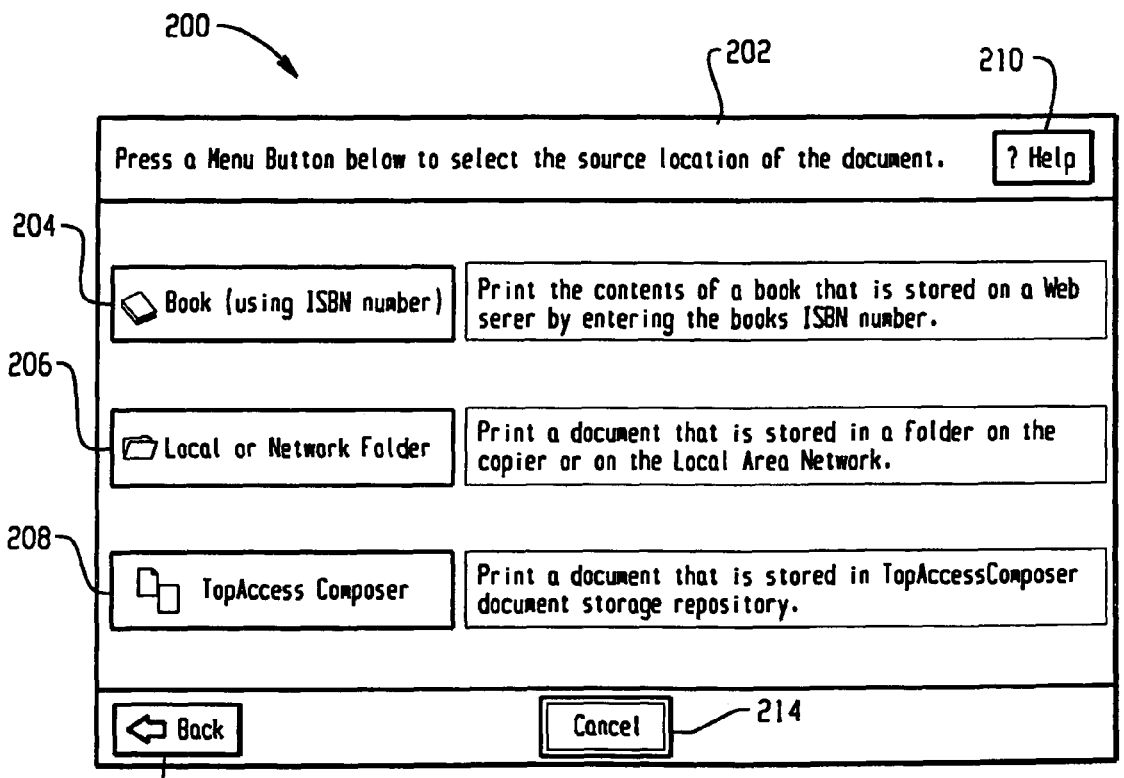
FIG. 2 is a view of an example copying user interface.

Upon selecting the print document option 106, a copying user interface 200 is displayed (FIG. 2). The copying user interface 200 presents at least one option for inputting a source location of an item to be printed. Such options suitably includes a book option 204, a local or network folder option 206, or other document storage repository 208, such as a TopAccess Composer repository. The copying user interface also advantageously includes a help option 210, an option 212 for returning to the first graphical user interface 102, such as a "back" button, and an option 214 for canceling operation, such as a "cancel" button. To print at least a portion of a book using the book's ISBN number, the user will select the book option 204. It is to be understood that the book option 204 is adapted to be modified to accommodate alternate identification means of the book, such as allowing for a bar code reader to read the book identification.

Figure 3:
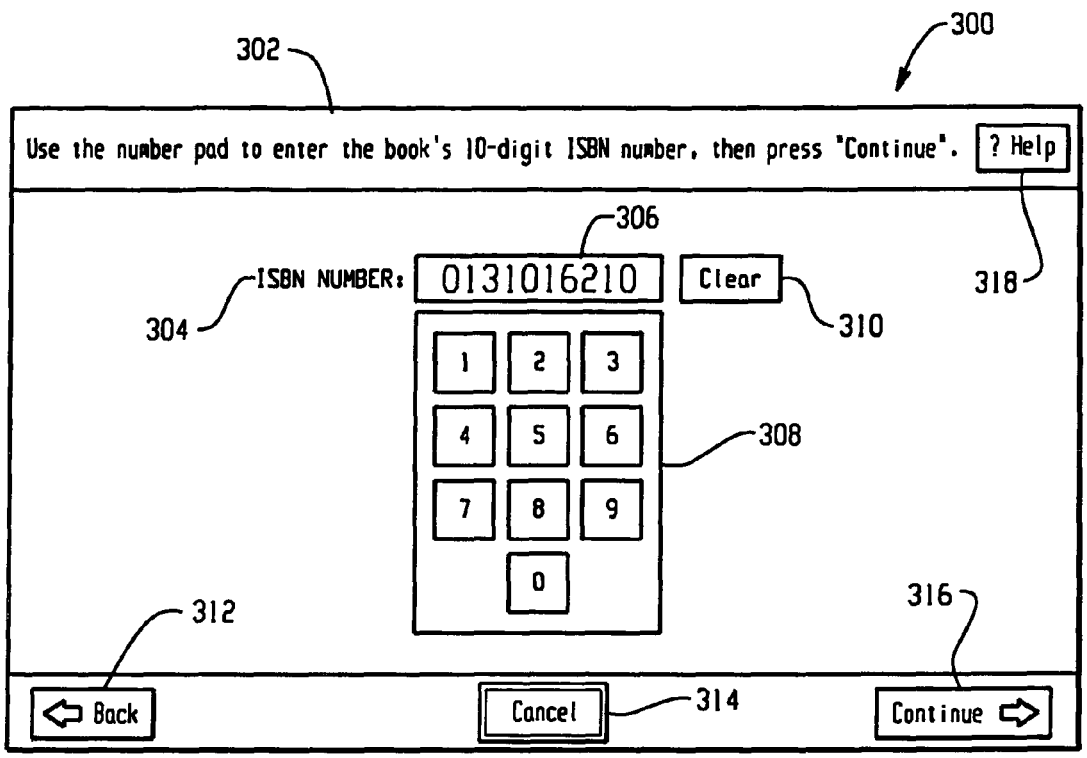
FIG. 3 is a view of an example ISBN entry user interface.

Upon selecting the book option 204, an ISBN entry user interface 300 is displayed (FIG. 3). The ISBN entry user interface 300 suitably contains a keypad 308 for entering the book's ISBN number. As the ISBN number is entered, it is suitably displayed in a window 306 in order to ensure that the entered number is accurate. A "clear" button 310 is provided to erase the entered ISBN number and to enable the user to reenter the correct number. Once the user is satisfied that the displayed ISBN number 306 matches the desired ISBN number, the user will select the "continue" button 316.

Figure 4:
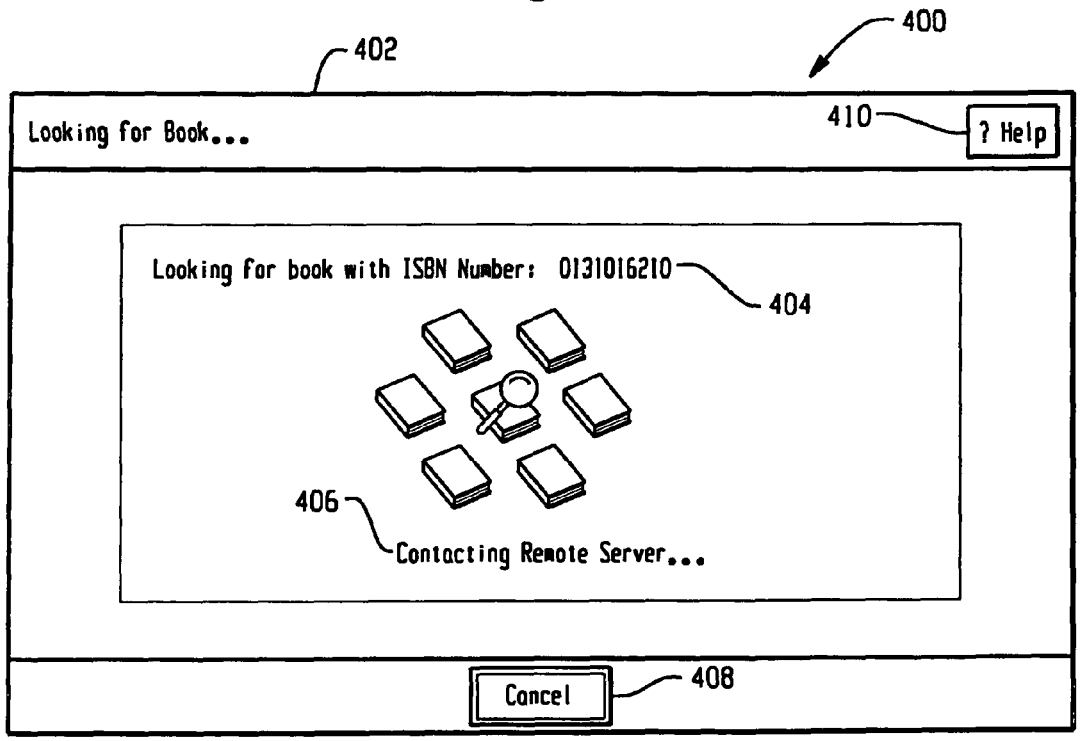
FIG. 4 is a view of an example electronic book access user interface.

Upon selecting the "continue" button 316, an electronic version access user interface 400 (FIG. 4) will cause a status of the peripheral's action in accessing the electronic file that corresponds to the ISBN number of the subject book to be displayed. The user interface 400 suitably displays such information as the ISBN number being accessed 404 and the state of the access 406. The interface 402 suitably additionally includes a "cancel" button 408. The electronic version access user interface 400 may suitably be preceded by a user interface that is adapted to receive user input regarding a location in which the desired electronic version is stored.

Figure 5:
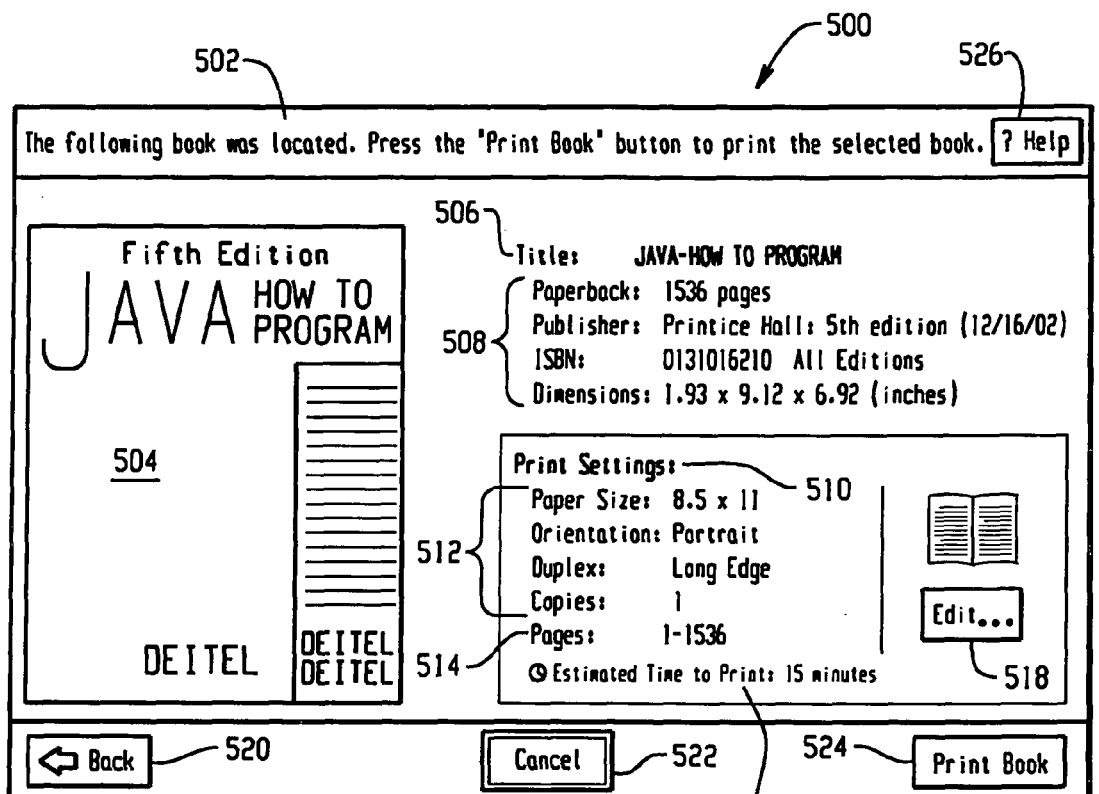
FIG. 5 is a view of an example print setting user interface.

Once the peripheral has located the electronic file, it initiates a download of the electronic file. Upon a successful download, a print setting user interface 500 (FIG. 5) will initiate a display of such information as necessary to enable the user to confirm that the downloaded electronic file corresponds to the desired book. Such information suitably includes the title 506 of the book, an image 504 of the cover of the book, and additional book-related information 508, such as the publisher, ISBN, etc.

The print setting user interface 500 suitably also includes print setting information 510 and an option 518 (e.g., an "edit" button) for changing the print setting information 510. The print setting information 510 suitably includes such information as paper size, orientation, number of copies 512, etc. Additionally, the print setting information 510 suitably includes the pages 514 of the book to be printed. The pages 514 to be printed is an feature that advantageously can be edited in the edit option 518. For example, if a user wants to print only pages 10-20 of a certain book, the user can specify through the edit option 518 that only pages 10-20 of the downloaded book will be printed. The user interface 500 suitably additionally provides information 516 related to the estimated time to print the selected page(s). Once the user has verified the downloaded book and is satisfied with the print settings 510, the user will instruct the peripheral to print the selected items, such as by selecting the "print book" button 524.

Figure 6:
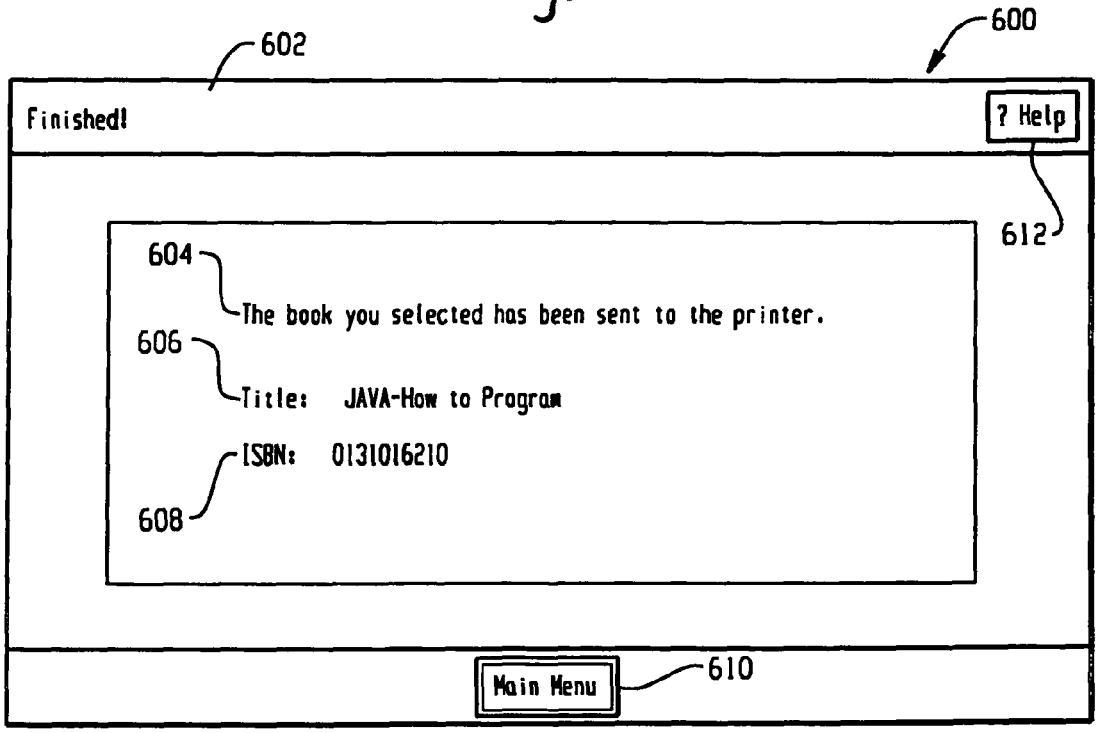
FIG. 6 is a view of an example print job status user interface.

Once the user has instructed the peripheral to print, a print job status user interface 600 (FIG. 6), suitably displays status information, such as whether the book has been sent to the printer 604, the title 606 of the book, and the ISBN number 608 of the book.

It is to be appreciated that the foregoing discussion of entry of ISBN numbers is by way of example only and that other methods for identifying the subject book are contemplated. For example, the user suitably inputs the title of the book. Additionally, the peripheral is adapted accept limited information regarding the identity of the book from the user and generate a list of possible related books based on the input information, whereupon the user suitably selects the desired title.

It is to be appreciated that the foregoing discussion of multiple graphical user interfaces is by way of illustration and example only. The essential steps of inputting a book identification, downloading an electronic file corresponding to the book and printing at least a part of the book, is suitably implemented through any means practicable, including the graphical user interfaces described above, a portion thereof, or with additional graphical user interfaces. Additionally, a graphical user interface suitably need not be used and the peripheral simply includes a keypad for inputting the ISBN number and an automated function for accessing, downloading and printing the associated electronic file.

Although the preferred embodiments have been described in detail, it should be understood that various changes, substitutions and alterations can be made therein without departing from the spirit and scope of the invention as defined by the appended claims. It will be appreciated that various changes in the details, materials and arrangements of components, which have been herein described and illustrated in order to explain the nature of the invention, may be made by those skilled in the art within the principle and scope of the invention as will be expressed in the appended claims.

What is claimed is:

1. A system, implemented through a peripheral device, for printing electronic files comprising:
    a document processing device including a printer and a user interface;
    a scanner associated with the document processing device for scanning indicia on a hardcopy of a printed publication;
    means adapted for decoding book identification information from the scanned indicia;
    means adapted for sequentially searching an associated local storage device and a remote storage device;
    a network data output means adapted for communicating received book identification information to a network search engine in accordance with an output of the sequential searching means indicative of a null result for the decoded book identification information relative to the local storage device and the remote storage device;
    electronic file retrieving means adapted for retrieving an electronic file from a remote data server, selected in accordance with an output of the network search engine, responsive to the received book identification information, wherein the electronic file is representative of at least one selected book;
    means adapted for generating a thumbnail image on the user interface corresponding to at least a cover portion of the electronic file;
    means adapted for receiving user confirmation input via the user interface corresponding to acceptance of the electronic file in accordance with the thumbnail image;
    page selection data receiving means adapted for receiving, from an associated user, data corresponding to content selected as at least one page number corresponding to a subset of pages selected by the user for reproduction via the document processing device user interface;
    means adapted for receiving, via the user interface, print control data corresponding to selected page output settings corresponding to the selected content;
    print job creation means adapted for preparing the electronic file for printing thereafter;
    output means adapted for receiving print request data representative of a desired output of the print job;
    means adapted for generating, on the user interface, data corresponding to an estimated print time associated with the subset of pages selected by the user; and
    means adapted for commencing a print operation of each page of the subset thereof of the electronic file received from the remote storage device in accordance with the print request, print control data, and page selection data on the document processing device so as to print the pages containing the selected content.

2. The system of claim 1, wherein the book identification information comprises a book ISBN number.

3. The system of claim 1, wherein the user interface comprises a keypad for inputting the book ISBN number.

4. The system of claim 1, wherein the user interface comprises a bar code reader adapted for receiving the book ISBN number.

5. The system of claim 1 further comprising data communication means adapted for enabling the peripheral device to communicate with a storage means adapted for storing the electronic file.

6. The system of claim 5, wherein the data communication means includes a hard wired connection to the peripheral device.

7. The system of claim 5, wherein the data communication means includes a wireless connection, and wherein the wireless connection includes at least one of a BlueTooth™, 802.11(g) and 802.11 connection.

8. The system of claim 5, wherein the storage means comprises at least one of a local storage device and a remote storage device.

9. The system of claim 5, wherein the storage means is accessible via the user interface.

10. A method, implemented through a peripheral device, for printing electronic files comprising the steps of:
    scanning indicia on a hardcopy of a printed publication via a scanner associated with a document processing device;
    decoding book identification information from the scanned indicia;
    sequentially searching an associated local storage device and a remote storage device;
    communicating received book identification information to a network search engine in accordance with an output of the sequential searching indicative of a null result for the decoded book identification information relative to the local storage device and the remote storage device;
    retrieving an electronic file from a remote data server, selected in accordance with an output of the network search engine, in response to the received book identification information, wherein the electronic file is representative of at least one selected book;
    generating a thumbnail image on the user interface corresponding to at least a cover portion of the electronic file;
    receiving user confirmation input via the user interface corresponding to acceptance of the electronic file in accordance with the thumbnail image;
    receiving, from an associated user, data corresponding to at least one page number corresponding to content selected as at least one page number corresponding to a subset of pages selected by the user for reproduction via the document processing device interface;
    receiving, via the user interface, print control data corresponding to selected page output settings corresponding to the selected content;

creating a print job by preparing the electronic file for printing;
receiving print request data representative of a desired output of the print job;
generating, on the user interface, data corresponding to an estimated print time associated with the subset of pages selected by the user; and
commencing a print operation of each page of the subset thereof of the electronic file received from the remote storage device in accordance with the print request, print control data, and page selection data on the document processing device so as to print the pages containing the selected content.

11. The method of claim 10, wherein the book identification information comprises a book ISBN number.

12. The method of claim 10 further comprising the step of inputting the book ISBN number through a keypad associated with the user interface.

13. The method of claim 10 further comprising the step of inputting the book ISBN number through a bar code reader associated with the user interface.

14. The method of claim 10 further comprising the step of the peripheral device communicating with a storage means, adapted for storing the electronic file, through a data communication device.

15. The method of claim 14, wherein the data communication device includes a hard wired connection to the peripheral device.

16. The method of claim 14, wherein the data communication device includes a wireless connection, wherein the wireless connection includes at least one of a BlueTooth™, 802.11(g) and 802.11 connection.

17. The method of claim 14, wherein the storage means comprises at least one of a local storage device and a remote storage device.

18. The method of claim 14, wherein the storage means is accessible via the user interface.

19. A computer-implemented method for printing electronic files comprising the steps of:
scanning indicia on a hardcopy of a printed publication via a scanner associated with a document processing device;
decoding book identification information from the scanned indicia;
sequentially searching an associated local storage device and a remote storage device;
communicating received book identification information to a network search engine in accordance with an output of the sequential searching indicative of a null result for the decoded book identification information relative to the local storage device and the remote storage device;
retrieving an electronic file from a remote data server, selected in accordance with an output of the network search engine, in response to the received book identification information, wherein the electronic file is representative of at least one selected book;
generating a thumbnail image on the user interface corresponding to at least a cover portion of the electronic file;
receiving user confirmation input via the user interface corresponding to acceptance of the electronic file in accordance with the thumbnail image;
receiving, from an associated user, data corresponding to at least one page number corresponding to content selected as at least one page number corresponding to a subset of pages selected by the user for reproduction via the document processing device interface;
receiving, via the user interface, print control data corresponding to selected page output settings corresponding to the selected content;
creating a print job by preparing the electronic file for printing;
receiving print request data representative of a desired output of the print job;
generating, on the user interface, data corresponding to an estimated print time associated with the subset of pages selected by the user; and
commencing a print operation of each page of the subset thereof of the electronic file received from the remote storage device in accordance with the print request, print control data, and page selection data on the document processing device so as to print the pages containing the selected content.

20. The computer-implemented method of claim 19, wherein the book identification information comprises a book ISBN number.

21. The computer-implemented method of claim 20 further comprising the step of inputting the book ISBN number through a keypad associated with the user interface.

22. The computer-implemented method of claim 20 further comprising the step of inputting the book ISBN number through a bar code reader associated with the user interface.

23. The computer-implemented method of claim 19 further comprising the step of the peripheral device communicating with a storage storing the electronic file, through a data communication device.

24. The computer-implemented method of claim 23, wherein the data communication device includes a hard wired connection to the peripheral device.

25. The computer-implemented method of claim 23, wherein the data communication device includes a wireless connection, wherein the wireless connection includes at least one of a BlueTooth™, 802.11(g) and 802.11 connection.

26. The computer-implemented method of claim 23, wherein the storage comprises at least one of a local storage device and a remote storage device.

27. The computer-implemented method of claim 23, wherein the storage is accessible via the user interface.

28. A system, implemented through a peripheral device, for printing electronic files comprising:
a document processing device including a processor, a printer and a user interface;
a scanner associated with the document processing device for scanning indicia on a hardcopy of a printed publication;
the processor operable for decoding book identification information from the scanned indicia;
the processor further operable for sequentially searching an associated local storage device and a remote storage device;
a network data output operable for communicating received book identification information to a network search engine in accordance with an output of the sequential searching indicative of a null result for the decoded book identification information relative to the local storage device and the remote storage device;
the processor further operable for retrieving an electronic file from a remote data server, selected in accordance with an output of the network search engine, responsive to the received book identification information, wherein the electronic file is representative of at least one selected book;

the processor further operable for generating a thumbnail image on the user interface corresponding to at least a cover portion of the electronic file;

an input operable for receiving user confirmation input via the user interface corresponding to acceptance of the electronic file in accordance with the thumbnail image;

an input operable for receiving, from an associated user, data corresponding to content selected as at least one page number corresponding to a subset of pages selected by the user for reproduction via the document processing device user interface;

an input operable for receiving, via the user interface, print control data corresponding to selected page output settings corresponding to the selected content;

the processor further operable for preparing the electronic file for printing thereafter;

an input operable for receiving print request data representative of a desired output of the print job;

the processor further operable for generating, on the user interface, data corresponding to an estimated print time associated with the subset of pages selected by the user; and the processor further operable for commencing a print operation of each page of the subset thereof of the electronic file received from the remote storage device in accordance with the print request, print control data, and page selection data on the document processing device so as to print the pages containing the selected content.

29. The system of claim 28, wherein the book identification information comprises a book ISBN number.

30. The system of claim 29, wherein the user interface comprises a keypad for inputting the book ISBN number.

31. The system of claim 29, wherein the user interface comprises a bar code reader adapted for receiving the book ISBN number.

32. The system of claim 29 further comprising a data communication output operable for enabling the peripheral device to communicate with a storage operable for storing the electronic file.

33. The system of claim 32, wherein the data communication output includes a hard wired connection to the peripheral device.

34. The system of claim 32, wherein the data communication output includes a wireless connection, and wherein the wireless connection includes at least one of a BlueTooth™, 802.11(g) and 802.11 connection.

35. The system of claim 32, wherein the storage comprises at least one of a local storage device and a remote storage device.

36. The system of claim 32, wherein the storage is accessible via the user interface.

\* \* \* \* \*